United States Patent [19]
Anderson et al.

[11] 4,035,201
[45] July 12, 1977

[54] METHOD OF MAKING A CONTAINER INCLUDING AN ALUMINUM PANEL HAVING A PORTION REMOVABLE BY TEARING

[75] Inventors: William Albert Anderson, Pittsburgh; Arvil Burke McKee, Lower Burrell; John Knox McBride, New Kensington, all of Pa.

[73] Assignee: Aluminum Company of America, Pittsburgh, Pa.

[21] Appl. No.: 666,619

[22] Filed: Mar. 15, 1976

Related U.S. Application Data

[62] Division of Ser. No. 591,700, June 30, 1975, Pat. No. 3,963,143.

[51] Int. Cl.² .......................... B23P 3/06; C22F 1/04
[52] U.S. Cl. ...................... 148/11.5 A; 148/11.5 Q; 148/12.7 A; 148/127
[58] Field of Search ............... 148/11.5 A, 12.7 A, 148/127, 11.5 Q; 29/197.5

[56] References Cited

U.S. PATENT DOCUMENTS

| | | | |
|---|---|---|---|
| 3,310,389 | 3/1967 | Doyle | 29/197.5 |
| 3,498,849 | 3/1970 | Munday et al. | 148/11.5 A |
| 3,502,448 | 3/1970 | Anderson et al. | 29/183.5 |
| 3,787,248 | 1/1974 | Setzer et al. | 148/11.5 A |
| 3,850,585 | 11/1974 | Webb | 29/197.5 |
| 3,857,973 | 12/1974 | McKee et al. | 29/197.5 |
| 3,893,823 | 7/1975 | Webb | 29/197.5 |
| 3,973,921 | 8/1976 | Ward et al. | 29/197.5 |

FOREIGN PATENT DOCUMENTS 816,182   7/1959   United Kingdom

*Primary Examiner* — W. Stallard
*Attorney, Agent, or Firm* — Carl R. Lippert

[57] ABSTRACT

An improved container featuring an aluminum end or panel having a tear open portion defined by score lines provided in an aluminum composite having a core composed of an aluminum alloy consisting essentially of 1 to 7% of one or more elements selected of the group of up to 3% copper, up to 4% magnesium and up to 1.5% manganese, the balance essentially aluminum and an aluminum cladding layer consisting of aluminum and, optionally, some amount of zinc but less than 1% with the cladding facing the contents of the container. The solution potential of the core and cladding are controlled in order to achieve the desired protection. A thermal treatment can be employed to control the electrochemical performance of certain composites.

19 Claims, 3 Drawing Figures

METHOD OF MAKING A CONTAINER INCLUDING AN ALUMINUM PANEL HAVING A PORTION REMOVABLE BY TEARING

This is a division of application Ser. No. 591,700, filed June 30, 1975, now U.S. Pat. No. 3,963,143. This invention relates to improved containers for corrosive food and beverage products. More particularly this invention relates to such containers or cans including an aluminum panel or can end which may be provided with a tear open portion. More specifically, this invention relates to such improved containers and panels therefor fashioned from an improved aluminum sheet stock to provide such with greatly improved corrosion resistance to provide containers with substantially improved useful shelf life.

FIGURES

In the description below reference is made to the drawings in which.

BACKGROUND

Figure 1:
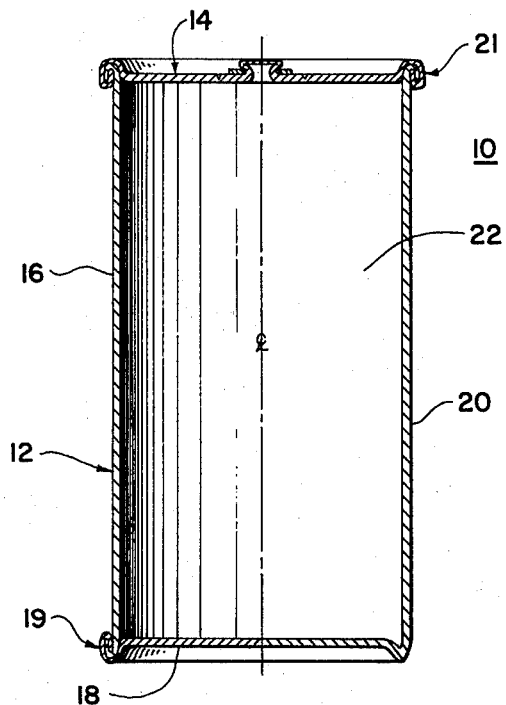
FIG. 1 is a cross sectional elevation of a container.
Figure 2:
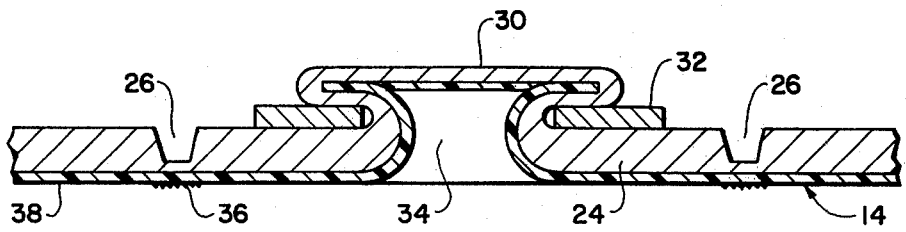
FIG. 2 is an enlarged cross sectional elevation of a portion of a container panel featuring easy open provisions.

Aluminum has become popular in the container field because of its ability to be fabricated into containers and container portions or panels featuring easy-open or pull-tab provisions such as the general types depicted in U.S. Pat. Nos. 3,191,797 and 3,424,337. A typical container which can include aluminum is illustrated in FIG. 1 where the container 10 shown is a can featuring a body portion 12 and a lid portion 14. The body portion 12 includes cylindrical side wall portion 16 joined to end portion 18 by a conventional double seam 19. In FIG. 1 the view has been split with respect to the bottom portion such that the right-hand side of the view features an integral can body 20 wherein the side wall portion and can bottom are formed integrally as by known operations such as extrusion or drawing with or without ironing to elongate and thin the side wall portions. Typically the can body portion, including a bottom portion either separately or integrally as just described, is filled with its contents 22 after which the can lid 14 is affixed as by double seams 21.

Where the can lid 14 includes easy-open or pull-tab provisions wherein a portion of the lid is removable by tearing, that portion being defined by score lines passing partially through the can lid metal, substantial problems occur where the contents of the can are corrosive and especially where they are under pressure. A typical removable portion of a can end is illustrated in FIG. 2 wherein the can lid or container panel 14 features a displaceable tear strip 24 defined by scored tear lines 26. The score lines 26 describe a closed outline or periphery of the portion of the container panel which is removable or displaceable by the application of force, typically manual force. The force causes initial fracture by tensile, shearing or tearing effects, or combinations thereof, and further application of force effects propagation of the fracture typically by tearing. One arrangement features a pull tab secured to the tear strip by an integral rivet 30 drawn from the sheet forming the end or container panel. The integral rivet fastens the pull tab or ring 32 to the tear strip 24 to enable the application of force thereto to effect removal or displacement thereof. That is, opening the container merely requires pulling the tab or ring to rupture the container end and continuing the pulling action to remove or displace the tear strip along the score lines 26. The portion of the container end or panel removed or displaced thereby can vary from a relatively small strip or other portion, as typically with beverages, to substantially the entire panel or can end as with soups and other foods. One popular example appears in the ends of beer cans where the tear strip is of a keyhole shape.

In making the container end aluminum sheet stock typically is first coated on one or both sides with a protective organic coating. Suitable coatings include thermoset vinyls or epoxy formulations. The sheet is then cut into blanks which are formed or converted to easy-open ends by scoring the outline of the removable or displaceable tear strip on the outer surface of the can end or panel portion and, where an integral rivet is employed, the drawing and compressing of the integral rivet. Referring again to FIG. 2 in those inside portions 34 under the integral rivet and 36 under the score area, the protective organic coating 38 is disturbed and the integrity of the protection often severely reduced because of the forces and metal movement associated with the scoring and rivet forming operations. This effect is not particularly harmful in beer can ends because of the chemical behavior of beer which is not particularly severe. However, there are some corrosive beverage and food products where a fractured and disturbed protective coating can lead to failure of the container system. Such food products include carbonated soft drink beverages, vegetable and fruit juices, together with soups, vegetables and other retorted food products. These corrosive foods attack the metal exposed by the damaged coating beneath the score lines and, as the metal here is quite thin having been reduced to only a few thousandths of an inch, penetration at these sites is often the result of the corrosion. A can end or container panel is typically about 0.010 inch to about 0.014 inch in thickness and the reduced section of the scored portion is only about 0.004 inch in thickness and thus any significant pitting corrosion at this point can readily penetrate that thickness. The result of the attack is typically premature perforation at the sites, that is along the score line, in as little as a few days of storage. In the case of thermally processed foods such as soups or vegetables which are typically retorted for about one hour at about 250° F, failures sometimes occur by the time the cans are removed from the retort or shortly thereafter thus presenting a very serious problem to the food packaging industry. The perforations referred to may be extremely small in that they are often not readily visible although they are sufficient to completely relieve any internal pressure or vaccum in the container and thus destroy the integrity of the seal. The corrosion picture is complicated further by the fact that aluminum can ends can be employed on container bodies fashioned from protectively coated or bare "tin plate" (tin coated steel) or coated tin-free steel or of aluminum of a different alloy than the scored container portion and by the fact that the chemical nature of the can body itself exerts a dominant influence on the corrosion effects of the scored aluminum can ends. To date there is no economical organic coating suitable for use in food containers which can reliably sustain the scoring operation. One obvious solution to the problem is to repair coat the damaged areas, that is areas 36 and 34 in FIG. 2. However, attempts to use repair coated easy-open container ends have proven difficult, expensive, and in the case of retortable products, they have proven unreliable. Of course, the use of two or three repair coats offers some improvements but the costs of such are very unattractive. The use of electrochemical protective systems has been considered but prior attempts at electrochemical protection have often been either unreliable in preventing perforations or have further introduced additional problems with respect to swelling of the container caused by hydrogen generation.

DETAILED DESCRIPTION

In accordance with the invention, within certain carefully prescribed limits aluminum composite sheet serves to effectively protect the can end or container panel exposed to the container contents including, where a coating is present, the areas of coating fracture or impairment while substantially avoiding excessive hydrogen generation and the attendant swelling problem. Included also in the invention are certain practices employed in producing certain preferred embodiments to further the improvement.

Figure 3:
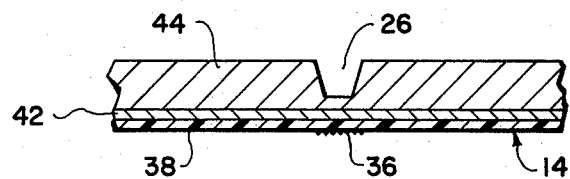
FIG. 3 is a cross sectional elevation of a portion of a container panel featuring the present improvement.

Referring to FIG. 3, it has been found that providing the container panel 14 as a composite having a core 44 composed of an aluminum alloy consisting essentially of up to 3% copper, up to 1.5% manganese and up to 4% magnesium, balance essentially aluminum, together with an inside cladding layer 42 which may be relatively high purity aluminum or an alloy containing zinc in amounts of less than 1%, for instance up to 0.9%, accomplishes the desired purpose in a commercially uncomplicated and economical fashion. All compositions herein are by weight. A coating, typically an organic coating, 38 can be applied to the cladding layer 42. It is important in practicing the invention that the core and cladding be electrochemically balanced as explained hereinafter to provide the degree of anodic protection necessary to eliminate perforation while still avoiding the swelling problem. Briefly what is referred to is that the difference in solution potential between the cladding metal 42 and the core metal 44 should be from 15 or 20 millivolts, up to about 125 millivolts, but preferably within the range of about 25 to 75 millivolts, the cladding layer being anodic to the core portion 44 so as to provide cathodic protection thereto. Within these broadly stated limits certain further refinements and preferences will be made clear hereinbelow.

The core alloys in accordance with the invention contain one or more of the elements Cu, Mg and Mn, but should contain a minimum of 1% total of elements from this group and a maximum total not to exceed 7%. A preferred range would typically be from 1.5% to 4.0%. In addition to the alloying additions Cu, Mg and Mn, or combinations thereof, the core alloys also contain the typical impurities and incidental elements associated with aluminum either as impurities or as deliberate additions in amounts of up to 1% iron, up to 0.5% silicon and up to 0.3% zinc, up to 0.25% chromium and further incidental elements such as titanium in amounts of up to 0.06% as a grain refiner and other elements conventionally present in aluminum alloys for grain refining or other purposes. Suitable specific core alloys in practicing the invention include those listed below in Table I which also lists the solution potentials for the alloys in a solution containing 9 milliliters of 30% hydrogen peroxide and 53 grams of NaCl per liter. Solution potentials as used in this description are based on the 0.1 normal calomel electrode scale with the larger, but negative, numbers being more anodic with respect to the lower numbers.

TABLE I

| Alloy | Mg, % | Mn, % | Cu, % | Average or Typical Solution Potentials, mv. |
|---|---|---|---|---|
| 1 | 3.5 | 0.75 | — | −860 |
| 2 | 2.5 | — | — | −840 |
| 3 | 2.5 | — | 0.5 | −830 |
| 4 | 2.5 | — | 1.0 | −820 |
| 5 | 1.0 | 1.2 | — | −830 |
| 6 | 1.0 | 1.2 | 0.4 | −814 |
| 7 | 1.0 | 1.2 | 0.6 | −804 |
| 8 | 2.5 | 0.25 | 1.0 | −780 |
| 9 | 0.35 | 0.25 | 1.2 | −765 |
| 10 | 1.0 | 1.0 | 0.65 | −785 |
| 11 | 1.0 | 1.0 | 0.4 | −805 |
| 12 | — | 1.0 | 0.2 | −815 |
| 13 | 0.4 | 0.25 | 1.75 | −740 |
| 14 | 0.4 | 0.25 | 2.35 | −730 |
| 15 | — | — | 1.00 | −780 |

The alloys listed in Table I are quite useful in fabricating can ends because of their strength and economic characteristics which weigh heavily in their favor. For instance, alloy 2 has a tensile strength of 47 ksi in the hard rolled condition and is quite easily fabricated into tear-open can ends such that a commercial operation would have a typical rejection rate of less than one in ten thousand.

In viewing Table I it can be seen that the presence of copper lowers the numerical value of the solution potential, whereas increased amounts of magnesium have the opposite effect. Manganese generally has a small or negligible effect on solution potentials. Preferred core alloys in the practice of the invention have solution potentials of about −720 to −800 mv. Core alloys within the range of preferred compositions are selected on the basis of the intended application. If the application is a carbonated-beverage can, high strength is desired in the can end to resist internal pressures. These are most easily provided by the more highly alloyed core compositions. Similarly, in the case of retorted food products, internal pressures are generated which must be resisted by core alloys of adequate strength. For unretorted products such as puddings and gels, core alloys of relatively low strength can be employed.

Suitable cladding compositions are listed in Table II along with their solution potentials.

TABLE II

| Alloy | Zn, % | Al Purity, % | Solution Potential, mv. |
|---|---|---|---|
| A | 0.8 | 99.8 | −934 |
| B | 0.7 | 99.8 | −914 |
| C | 0.6 | 99.8 | −895 |
| D | 0.5 | 99.8 | −878 |
| E | 0.4 | 99.8 | −862 |
| F | 0.3 | 99.8 | −847 |
| G | 0.2 | 99.8 | −835 |
| H | 0.0 | 99.8 | −830 |

In the cladding layer the purity of the aluminum can be significant in that cladding performance is most consistent and indeed optimal where the aluminum purity is at least 99.5% and preferably 99.8 or 99.9%. That is, elements other than aluminum and zinc, where the cladding is an alloy containing Al and Zn, are preferably restricted to a maximum of 0.1 or 0.2% and certainly not over 0.5% in what could be viewed as a substantially pure aluminum or a substantially binary aluminum-zinc alloy. In general, the cladding alloys containing less zinc are less prone to cause swelling or bloating problems, and accordingly certain preferred embodiments of the invention favor a substantially pure aluminum clading or one of substantially pure aluminum, containing at least 99.8% aluminum, and less than 0.1% zinc, for instance 0.05 or 0.07% maximum zinc, and not more than 0.05% Cu. Such claddings have a typical solution potential of about −830 millivolts and are useful as cladding for core alloys having a solution potential difference of, say, 40 to 50 millivolts less, especially the alloys containing substantial amounts of copper, for instance from 1 to 2% and not more than 0.5% magnesium.

As indicated above, a matter of substantial concern in practicing the invention is to properly balance the electrochemical behavior between the core and cladding such that a condition of cooperation exists whereby the cladding affords sufficient cathodic protection to eliminate perforations or bring them to an acceptable limit while not introducing swelling problems. Broadly stated, it is desired that the difference in solution potential between cladding and core alloys fall between about 15 or 20 millivolts minimum up to a maximum of about 125 millivolts. Preferred limits are 25 to 75 millivolts with optimum performance in some instances occurring with solution potential differences of about 40 to 50 millivolts. Obviously, for any system to be effective it must be consistent and the condition of the metallurgical precipitates or constituent phases and their amount of distribution in the core alloy can become significant in this respect. Where the copper content is substantial in the core, such as where it exceeds 0.4%, a preferred sequence of fabrication assures a more consistent solution potential level, and this practice is explained hereinbelow.

It can be seen that there are substantial variations suitable in practicing the invention within the general guidelines herein set forth. However, the applicants have found certain core and cladding compositions within the overall practice of the invention to represent preferences, and these are now set forth in Table III. In Table III composition ranges for the core are set forth and aluminum base purity for the cladding plus the amount of zinc included, if any.

the copper-containing cores as to the condition of the copper content, that is, whether it is present as some sort of precipitate or in true solution. It has to be understood that some amount of copper can precipitate during fabrication and thus be removed from solution in the aluminum matrix which, in turn, alters the electrochemical behavior of the alloy. Thus, some preferred embodiments of the invention having substantial amounts of copper in the core favor preferred practices which tend to keep copper in solution. An ingot or other suitable rolling stock produced by any suitable means, typically continuous casting practices, might be homogenized at temperatures typically about 900° to 1100° F or more depending on composition for an extended period of time and then have its surfaces scalped as required for bonding and rolling. The composite is then assembled by adding to the scalped core ingot surface or surfaces the cladding material in sheet, plate or even powder form, which is then metallurgically bonded to the core by hot rolling in a typical temperature range of 750° to 900° F and then further rolled, for instance continuously to a sheet which is thereafter cold rolled with or without intermediate annealing. The cold rolling typically reduces the hot line gauge of 0.1 to 0.15 inch to a typical cold rolled thickness of 0.010 to 0.020 inch, although more often the thickness ranges from 0.010 to 0.015 inch, the cold rolling reduction typically amounting to 85% or 90% or more, and the resulting cold worked sheet product is in a severely strain hardened condition commonly designated as the H19 temper. What is important in practicing the here-described preferred practice of the invention where the core contains substantial amounts of copper is that thermal practices during fabrication of the clad sheet product be controlled to tend to keep copper from precipitating. This can be accomplished by exposing the material to a temperature above the alloy involved, typically about 700° in the case of preferred alloy compositions to obtain or retain good solution of the copper phase. Suitable temperatures can be estimated from known solvus curves for other aluminum-copper alloys and range from about 650° F for an alloy containing about 0.5% copper to temperatures over 800° F where the alloy contains several percent copper. The exposure to these temperatures is followed by cooling at a relatively rapid rate. This is not to say a very rapid rate in that a cooling rate of 25° to 50° F per

TABLE III

| Composite | Core | | | | Cladding | | | Sol. Pot. Difference |
|---|---|---|---|---|---|---|---|---|
| | Mg | Mn | Cu | Sol. Pot. | Al | Zn | Sol. Pot. | |
| I | .1–.6 | .1–.5 | .9–.5 | −770 | 99.8 | — | −830 | 60 |
| II | 2–3 | .1–.5 | .9–1.5 | −810 | 99.5 | — | −830 | 20 |
| III | .8–1.4 | 1–1.5 | .1–.3 | −805 | 99.9 | — | −835 | 30 |
| IV | .8–1.4 | 1–1.5 | .3–.7 | −795 | 99.7 | — | −830 | 35 |
| V | 2–3 | — | .3–.7 | −830 | 99.9 | .5–.8 | −880 | 50 |
| VI | 2–3 | — | .3–.7 | −830 | 99.9 | .1–.4 | −845 | 15 |
| VII | — | 1–1.5 | .5–1 | −800 | 99.9 | .1–.4 | −845 | 45 |

Referring to the preferred embodiment wherein the core contains substantial amounts of copper, for instance in excess of 0.4 or 0.6%, a typical range being 0.5 to 3% Cu, certain treatments during fabrication can be beneficial. This particular embodiment is preferred for a number of reasons, one being that it favors the use of a cladding containing lesser amounts of zinc than some of the other embodiments in accordance with the invention and accordingly swelling is kept to an absolute minimum. There is, however, some sensitivity in minute is usually sufficient for alloys containing less than about 1% copper and rates of 100° F per minute are often preferred where the alloy contains appreciably more than 1% copper. In any case the cooling becomes less important below a temperature of about 300° F. This cooling can be accomplished at varying stages in fabrication. For instance, it is beneficial if applied during hot and warm rolling such that temperature decreases there are at least as rapid as the amount designated. Also, a separate treatment can be interposed by way of annealing prior to cold rolling or between cold reductions whereby the metal is heated to a temperature of 650° to 800° F and then relatively rapidly cooled. Also, the treatment can be employed after cold rolling, for instance in the production of an organically coated sheet product where an organic coating is applied to the improved composite sheet and it is baked to cure the coating. Of course, heating after cold rolling tends to weaken the strain hardened condition of the metal and reduce tensile properties.

As explained earlier, there is a beneficial effect as to the electrochemical properties of the core which is that the electronegative potential of the core is diminished so as to render it more readily protected cathodically by a substantially pure aluminum cladding. To illustrate the effect of the preferred thermal-fabrication, a core alloy containing 1.2% copper was fabricated in accordance with the improvement by homogenizing at a temperature of 950° F, hot and continuous rolling at an initial temperature of 800° F to a sheet about 0.110 inch thick and then passing the coiled sheet through a continuous furnace maintained at an 850° F metal temperature followed by air quenching the sheet, as it exits the furnace, at a rate of approximately 500° F per minute. This sheet is then cold rolled to a gauge of about 0.010 inch and the resulting sheet has a solution potential of −765 millivolts. In another case metal of substantially the same composition is fabricated into sheet according to more conventional schedule including homogenization at 950° F, hot and continuous rolling at an initial temperature of 800° F and then annealing at 650° F followed by furnace cooling at a rate of around 70° F per hour with the annealed sheet, about 0.110 inch thick then cold rolled to final gauge of about 0.010 inch. This sheet had a solution potential of about −800 millivolts. It can be seen from this example that the preferred thermal treatment reduces the solution potential of the core by 35 millivolts which is quite substantial. Thus, where copper is present in the core in amounts of over 0.4 or 0.5% and especially where it exceeds about 0.9%, one preferred practice of the invention includes a copper solution treatment wherein the metal is subjected to an elevated temperature of typically 600° or 650° F up to 800° F or higher, the temperature choice preferably increasing with increasing copper content. The thermal exposure is followed by relatively rapid cooling to retain the copper in solution, the rate being considerably faster than the slow furnace cooling conventionally employed after annealing treatments. The improved thermal practice can be employed at varying stages of production, for instance before hot rolling, with cooling occurring during and/or after hot rolling. Alternatively or additionally the thermal practice can be employed after hot rolling as an intermediate anneal or even after cold rolling, although in this last instance it degrades tensile properties and therefore often needs to be accomplished quickly. This is not especially difficult since the sheet, after cold rolling, is thin and readily heated quickly to a high temperature of 850° F or thereabout and then readily quenched very rapidly. These preferred practices result in a structure where all or substantially all the copper is in solid solution by which is meant that, considering a typical copper range of about 0.4 to 3%, at least 95 to at least 80% (the minimum varying inversely with copper) of the copper present is in solid solution. This condition favors lower solution potential levels in the core alloys which is often preferred.

Composite sheet in accordance with the invention typically varies in thickness from about 0.010 inch or less to about 0.014 inch but may vary down to 0.008 or up to 0.02 inch, of which the cladding typically constitutes from around 2 to 15%. The cladding can be placed on both faces of the core for desired assurance that it faces the inside of any container, and this is considered a preferred practice. In accordance with the invention, there is also provided an improved method for producing a scored can end or container panel and hermetically sealed cans utilizing such particularly in association with corrosive media such as corrosive food products within the container.

As already indicated, one embodiment of the invention contemplates that the improved composite with or without a copper-containing core may be provided with an organic coating which can be baked to cure the coating. However, here some care is warranted to prevent excessive reduction of mechanical properties and hence the cure bake cycle time and temperature conditions are worthy of consideration and desirably the time at temperature is kept to a minimum commensurate with adequate coating cure. In a typical sequence the coiled sheet is coated and then fed as a single web through a furnace operating at typically 650° to 750° F and in such a speed as to accomplish the setting of the coating in very short periods of time, for example 10 seconds to about a minute. Suitable organic coatings for the purpose are, of course, known in the art and include thermoset and thermoplastic resins including epoxies, vinyls, polyesters and acrylics. The short exposures tend to reduce the effect on the solution potentials of the composite. With proper selection of coatings and curing conditions a desirable electrochemical state and attendant resistance to corrosion is obtained.

Where the core of the improved composite contains copper and where the preferred thermal practice for copper solution is performed at an earlier stage, for instance after hot rolling or before cold rolling, and a subsequent coating baking exposure is contemplated, such will result not only in decreased strength but can cause some precipitation of copper from solution. This precipitation shifts the solution potential of the core to a more electronegative level thus becoming more difficult to cathodically protect. Thus in those instances the baking cycles should be not only short and involve relatively rapid heating and cooling, but as low a temperature as practical should be employed for baking.

As already mentioned, the preferred thermal solution practice for copper-containing cores can itself be effected during coating cure. This influences the choice of peak curing temperature. In conventional sheet bake cycles the temperature can vary typically from about 350° to 550° F but where solution is to be effected during the coating bake cure operation, the temperature can range from about 650° F, or more, for a core containing 0.5% copper to a temperature of over 800° F or more where the core contains several percent copper. Of course, cooling after such an exposure should be relatively rapid, 25° to 50° F per minute or more, especially where the core contains more than 1% copper.

Getting back to the improved method for producing a container panel, the sheet with or without coating and baking is stamped or cut into discs which are then converted into tear-open can ends such as those depicted in the U.S. patents mentioned in the background discussion of this description. Thus referring to FIG. 2, score lines 26 are placed in the can end and integral rivet portion 30 is drawn up and collapsed to secure handle 32 to complete the improved tear-open can end 14. The improved can end is then employed to seal a container after the can portion is filled with the contents which can be a corrosive food product including beverages, juices, soups and other products. The can end is sealed to the can in a manner known in the art, a typical joint being a double seam joint 21 depicted in FIG. 1.

The improved method results in an improved container wherein the tear-open container portion in the improved composite provides cathodic protection to the entire container system, and it is very significant food and beverage products. Cans featuring easy-opening scored can ends fashioned from the improved composite sheets in accordance herewith and containing highly corrosive food products have sustained shelf life tests of 12–24 months and longer without any instance of failure by perforation or swelling, whereas containers fashioned with previous materials, including alloys in accordance with the core alloys listed in Table I and even including composites outside the practices of the invention, failed by perforation or swelling in as little as a few days, thus demonstrating the marked superiority of the present improvement and underscoring the substantial contribution of the improvements to the food packaging industry. This is illustrated in Table IV were the shelf life performance of alloy composites in accordance herewith is compared with other materials.

TABLE IV

| Product | Test Data for Tear Open Can Ends | | | |
| --- | --- | --- | --- | --- |
| | Example 1 5052 Core Nonclad (4) | Example 2 5082 Core (4) Al-1.3 Zn Clad | Example 3 3004 Core (4) Al-0.7 Zn Clad | Example 4 Composite I (4) |
| All-Aluminum Cans | | | | |
| Lemon Pudding | P-O | S-12 | OK-12 | OK-12 |
| Strawberry Gel | P-O | OK-12 | OK-12 | OK-12 |
| Sardines in Tomato Sauce | P-6 | OK-12 | OK-12 | OK-12 |
| Coated Tinplate Can Bodies | | | | |
| Tomato Juice | P-O | P-12 | — | OK-24 |
| V-8 Juice | P-O | OK-12 (2) | OK-12 | OK-24 |
| Chicken Noodle Soup | P-O | S-12; OK-12 (2) | OK-12 (2) (3) | OK-12 (3) |
| Tomato Soup | P-O | OK-12 (2) | OK-12 | OK-24 |
| Vegetarian Vegetable Soup | P-O | — | OK-12 (2) (3) | OK-12 (3) |
| Pork & Beans | P-O | OK-12 (2) | OK-12 (2) (3) | OK-12 (3) |
| Spanish Rice | P-O | — | OK-12 (2) (3) | OK-12 (3) |
| Spaghetti & Meat Balls | P-O | — | OK-12 | OK-12 |

Notes for Table IV
(1) P = perforations; S = swelling; OK = satisfactory; numbers designate months in test.
(2) Storage temperature 75° F; all other 100° F.
(3) Performed satisfactorily in vending machine (accelerated test): 15 days at 150 F.
(4) Composition - weight per cent

| Alloy | | Si | Fe | Cu | Mn | Mg | Cr | Zn | Ti |
| --- | --- | --- | --- | --- | --- | --- | --- | --- | --- |
| Example 1 | (nonclad) | .06 | .20 | .00 | .04 | 2.5 | .27 | .00 | .01 |
| Example 2 | (core) | .05 | .22 | .00 | .01 | 4.5 | .01 | .01 | .01 |
| | (cladding) | .05 | .05 | .00 | .00 | .00 | — | 1.3 | — |
| Example 3 | (core) | .13 | .30 | .01 | 1.0 | 1.1 | — | — | — |
| | (cladding) | .04 | .05 | .00 | .00 | .00 | — | .70 | — |
| Example 4 | (core) | .05 | .29 | 1.06 | .19 | .33 | .00 | .00 | .04 |
| | (cladding) | .05 | .10 | .00 | .01 | .00 | .00 | .01 | .01 | that this protection is achieved without substantial risk of swelling by hydrogen generation especially for the preferred composite featuring a substantial copper content in the core and a substantially pure aluminum cladding.

The strength of the improved composite for small or moderate cladding thicknesses is not much less than for core sheet of substantially the same thickness in the unclad conditions. For instance, in considering alloy 1 from the above Table I, the tensile strength in the cold rolled or H19 (cold rolled reduction of at least 85% in thickness) condition, an extremely strain hardened condition, is about 60 ksi, whereas that same alloy clad with about 5% thickness on each surface in accordance herewith is reduced to a composite strength of about 57 ksi. Thus employing the improved composite in accordance herewith does not seriously compromise the strength and mechanical properties of the container panel or can end while imparting thereto very substantial improvements in corrosion resistance and containing integrity. Even where the organic coating is drastically impaired by scoring or other operations, tests have verified that the improvement enables markedly improved shelf life in containers for corrosive foods and other corrosive products, but especially corrosive From viewing Table IV it can be seen that Examples 1 and 2 which are outside the scope of the present invention do not perform as well as Examples 3 and 4 which are within the practices of the present invention. More particularly, Example 1 is a more or less conventional non-clad can end sheet material and it can be seen that in the rather severe food products employed in the tests performed in Table IV that the non-clad material failed by perforation in less than one month in almost every instance. Thus, for the products involved this can end is quite unsuited. Example 2 is a clad can end but is outside the scope of the present invention since the core employed contains excessive magnesium and the clading contains excessive zinc. In viewing the results for Example 2 it can be seen that for certain food products, for instance, strawberry gel or sardines, its performance is satisfactory and even approaches or equals that of the improved composites of Examples 3 and 4. However, equally notable there are the failures for lemon pudding and tomato juice experienced in Example 2.

Turning now to the results for the improved composites, Examples 3 and 4 in Table IV it can be seen that satisfactory performance is experienced with all of the food products which thus renders the improved composites useful over a broad spectrum of food products. Thus, the improvements shown in Table IV for the present invention are highly significant in that a high level of reliability over a wide selection of food products is realized. One notable preference in practicing the invention is Example 4 which refers to composite I from Table III. This composite appears to offer outstanding reliability and consistency with respect to corrosion resistance in hermetically sealed containers holding corrosive foods and other products.

When referring to container panels and containers embodying such, such is intended in a broad sense in that the containers can be fashioned from almost any material such as steel or other ferrous or other non-aluminous metal or even non-metallic materials. What is contemplated is that a panel is provided in accordance with the improvement described herein. That panel can be cut into a circular or other pattern corresponding to the shape of the opening of the can or other container to be closed thereby or can be patterned specifically for use in containers including rectangular patterns suitable for forming into right cylinders and the like.

While the improved material here described facilitates special advantages in scored container panels, it is believed it should also be advantageous in non-scored panels and containers embodying such especially where the contents of the container are highly corrosive.

While the invention has been described in terms of preferred embodiments, the claims appended hereto are intended to encompass all embodiments which fall within the spirit of the invention.

What is claimed is:

1. The method of producing improved container stock sheet comprising the steps of:
   1. providing composite rolling stock composed of a core alloy consisting essentially of 0.4–3% copper, up to 0.6% magnesium and up to 1.5% manganese, balance essentially aluminum and incidental elements and impurities and a cladding layer composed of at least 99.5% aluminum and not more than 0.1% zinc;
   2. rolling said stock to produce a rolled sheet product;
   3. subjecting said rolling stock or said product to a thermal exposure at a temperature of at least 600° F and substantially at least the solvus temperature of said core alloy followed by relatively rapid cooling.

2. The method according to claim 1 wherein said rolling includes cold rolling to final gage and said thermal exposure occurs before said cold rolling.

3. The method according to claim 1 wherein said rolling includes cold rolling to final gage and said thermal exposure occurs subsequent to said cold rolling.

4. The method according to claim 1 wherein said temperature ranges from a minimum of 650° F to a minimum of 800° F, said minimum temperature varying with increasing copper content.

5. The method according to claim 1 wherein said core alloy contains at least 0.9% copper.

6. The method according to claim 1 wherein said core alloy contains 0.1 to 0.6% magnesium and 0.1 to 0.5% manganese.

7. The method according to claim 1 wherein said core contains at least 0.9% copper and said cooling in said step (3) proceeds at a rate of at least 100° F per minute.

8. A method according to claim 1 wherein said thermal exposure produces a condition wherein at least 95% to at least 85% of the copper present in said core is in solid solution, the minimum amount varying inversely with increasing copper content.

9. A method according to claim 1 wherein said rolling includes cold rolling to final gage and after said cold rolling an organic coating is applied to the cladding of said sheet product and said sheet product is exposed to an elevated temperature to cure said coating, said elevated temperature being a minimum of at least 650° to a minimum of at least 800°, said minimum temperature varying with increasing copper content of the core followed by a relatively rapid cooling rate of at least 25° F per minute to at least 100° F per minute varying with increasing copper content.

10. In the production of a container panel wherein a rolled aluminum alloy sheet product is shaped to form a panel adapted to serve in a container, the improvement wherein said sheet product is produced by the method comprising the steps of:
    1. providing composite rolling stock composed of a core alloy consisting essentially of 0.4–3% copper, up to 0.6% magnesium and up to 1.5% manganese, balance essentially aluminum and incidental elements and impurities and a cladding layer composed of at least 99.5% aluminum and not more than 0.1% zinc;
    2. rolling said stock to produce a rolled sheet product;
    3. subjecting said rolling stock or said product to a thermal exposure at a temperature of at least 600° F and substantially at least the solvus temperature of said core alloy followed by relatively rapid cooling.

11. In the method of producing a hermetically sealed container including a container panel, said method including the steps of scoring the outer surface of said container panel to describe a closed perimeter defining a removable portion in said panel, said score line extending sufficiently through the panel thickness to locally weaken it to render said portion defined thereby manually removable by tearing to provide an opening in said panel, and wherein said panel is produced from an aluminum alloy sheet product, the improvement wherein said aluminum sheet product is produced according to the steps comprising:
    1. providing composite rolling stock composed of a core alloy consisting essentially of 0.4–3% copper, up to 0.6% magnesium and up to 1.5% manganese, balance essentially aluminum and incidental elements and impurities and a cladding layer composed of at least 99.5% aluminum and not more than 0.1% zinc;
    2. rolling said stock to produce a rolled sheet product;
    3. subjecting said rolling stock or said product to a thermal exposure at a temperature of at least 600° F and substantially at least the solvus temperature of said core alloy followed by relatively rapid cooling.

12. In the method according to claim 11 wherein said rolling includes cold rolling to final gage and said thermal exposure occurs before said cold rolling.

13. In the method according to claim 11 wherein said rolling includes cold rolling to final gage and said thermal exposure occurs subsequent to said cold rolling.

14. In the method according to claim 11 wherein said temperature ranges from a minimum of 650° F to a minimum of 800° F, said minimum temperature varying with increasing copper content.

15. In the method according to claim 11 wherein said core alloy contains at least 0.9% copper.

16. In the method according to claim 11 wherein said core alloy contains 0.1 to 0.6% magnesium and 0.1 to 0.5% manganese.

17. In the method according to claim 11 wherein said core contains at least 0.9% copper and said cooling in said step 3) proceeds at a rate of at least 100° F per minute.

18. In the method according to claim 11 wherein said thermal exposure produces a condition wherein at least 95% to at least 85% of the copper present in said core is in solid solution, the minimum amount varying inversely with increasing copper content.

19. In the method according to claim 11 wherein said rolling includes cold rolling to final gage and after said cold rolling a coating is applied to the cladding of said sheet product and said sheet product is exposed to an elevated temperature to cure said coating, said elevated temperature being a minimum of at least 650° F to a minimum of at least 800° F, said minimum temperature varying with increasing copper content of the core, followed by a relatively rapid cooling rate of at least 25° F per minute to at least 100° F per minute varying with increasing copper content.

* * * * *

UNITED STATES PATENT AND TRADEMARK OFFICE
CERTIFICATE OF CORRECTION

PATENT NO. : 4,035,201
DATED : July 12, 1977
INVENTOR(S) : William A. Anderson et al It is certified that error appears in the above-identified patent and that said Letters Patent are hereby corrected as shown below:

| | |
|---|---|
| Col. 5, line 7 | Change "clading" to --cladding--. |
| Table III, under "Cu", line 1 | Change ".9-.5" to --.9-1.5--. |
| Col. 6, line 37 | After "above" add --the solvus of--. |
| Col. 9, line 52 | Change "conditions" to --condition--. |
| Col. 10, line 59 | Change "clading" to --cladding--. |

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*